May 9, 1967

JAMES E. WEBB
ADMINISTRATOR OF THE NATIONAL AERONAUTICS
AND SPACE ADMINISTRATION
HYDRAULIC DRIVE MECHANISM 3,318,093

Filed Jan. 13, 1965

Kentaro Tsutsumi
INVENTOR.

BY
ATTORNEYS

May 9, 1967

JAMES E. WEBB
ADMINISTRATOR OF THE NATIONAL AERONAUTICS
AND SPACE ADMINISTRATION
HYDRAULIC DRIVE MECHANISM 3,318,093

Filed Jan. 13, 1965

Kentaro Tsutsumi
INVENTOR.

BY

Marvin F. Matthews
ATTORNEYS

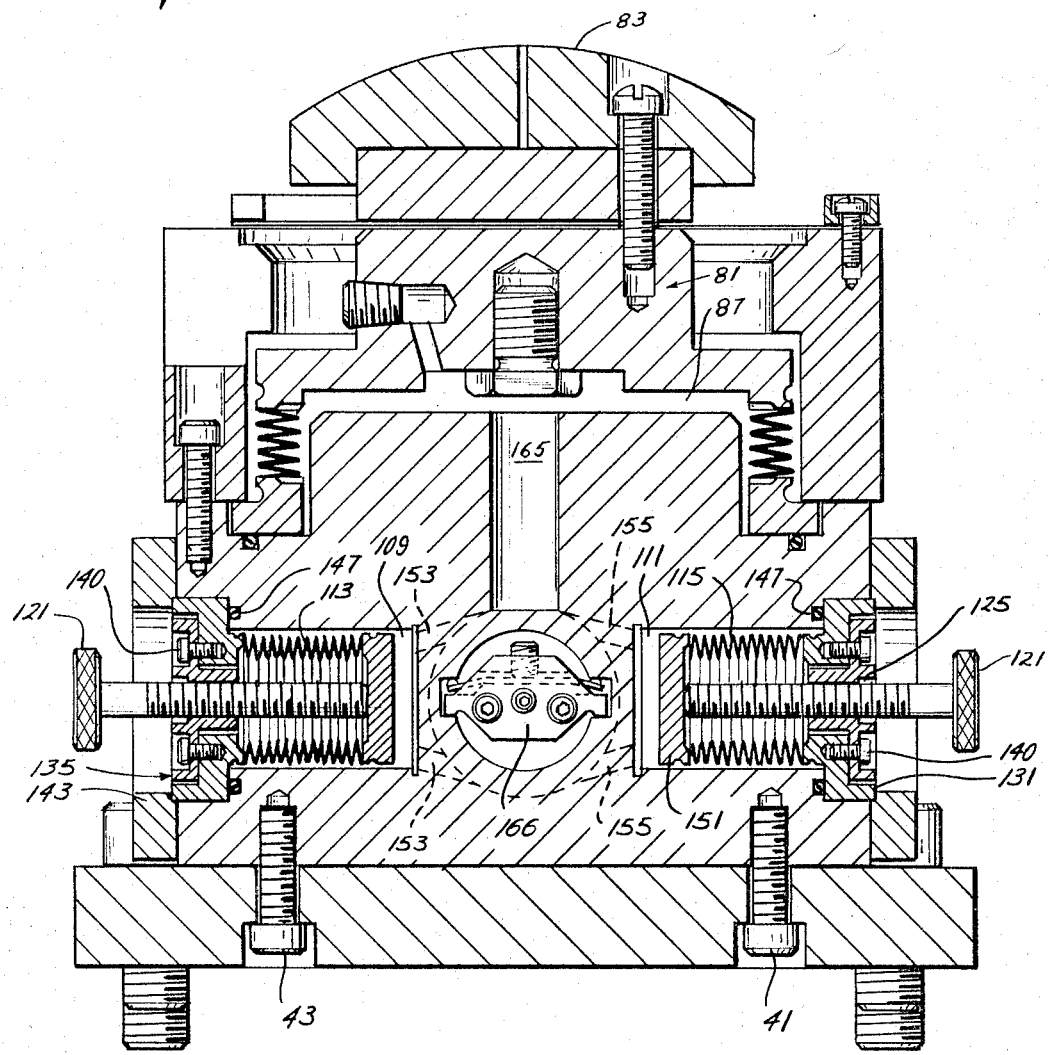

United States Patent Office 3,318,093
Patented May 9, 1967

3,318,093
HYDRAULIC DRIVE MECHANISM
James E. Webb, Administrator of the National Aeronautics and Space Administration, with respect to an invention of Kentaro Tsutsumi, Auburndale, Mass.
Filed Jan. 13, 1965, Ser. No. 425,362
1 Claim. (Cl. 60—54.5)

This invention relates to isolation platform leveling devices and more particularly to hydraulic drive mechanisms therefor.

An isolation platform such as is used for the support of seismographs, interferometer devices, autocollimators, and other precision scientific instruments must not only be extremely stable and level but must oftentimes include mechanical provisions therein for maintaining itself in a constantly level plane regardless of external environmental disturbances. Such a mechanical provision is particularly necessary when the accuracy of the readings on the instrument are adversely affected beyond the tolerance limits for acceptable performance. One method for achieving a self-leveling table is to provide thereon one or more disturbance-detection devices which are each connected to an automatic adjustment jack which supports the table at points beneath each detector. When an external disturbance displaces the table from its horizontal plane, a detection device emits a signal to its corresponding jack, which in turn raises that portion of the table which has been displaced from the horizontal plane.

Heretofore external environmental disturbances of the stray low frequency variety, such as changes in ambient atmospheric conditions, microseismic waves, and precession of the earth's polar axis, have been difficult to detect because of their small magnitude. However, detection instruments have been developed which can, with accuracy and reliability, detect these otherwise imperceptible disturbances. One such instrument, the Geotilt Recorder, utilizes a liquid level vial connected to an ionization transducer which produces a D.C. voltage proportional to the displacement of the vial bubble. This instrument, developed by the Instrumentation Laboratory of the Massachusetts Institute of Technology, has measured microseismic waves with amplitudes on the order of .004 to .001 inch.

With the advent of improved detecting instruments, it became necessary to refine the jacking mechanisms accordingly so as to enable them to accept signals and execute the minute movements which the detecting instruments are capable of measuring. The subject invention, which is referred to as a micromotion jack, or drive, discloses such a device. The micromotion jack embodies a new and improved hydraulic drive system having a casing design which permits no fluid leakage despite the capability of the jack to lift up to 18,000 pounds. Due to the substantial elimination of friction and backlash within the drive mechanism, the jack is capable of receiving servomotor movements and transmitting them to the load in micro distances as small as .000001 of an inch. In addition, it may be noted that because the micromotion jack is extremely light (approximately 40 pounds) and compact (7" x 7" x 7") it is portable and may be used in varied applications. Other features and numerous advantages will become readily apparent upon a reading of the following specification and drawings wherein:

FIG. 4 is a vertical cross sectional view of the micromotion jack through the axis Y—Y of FIG. 2.

Figure 1:
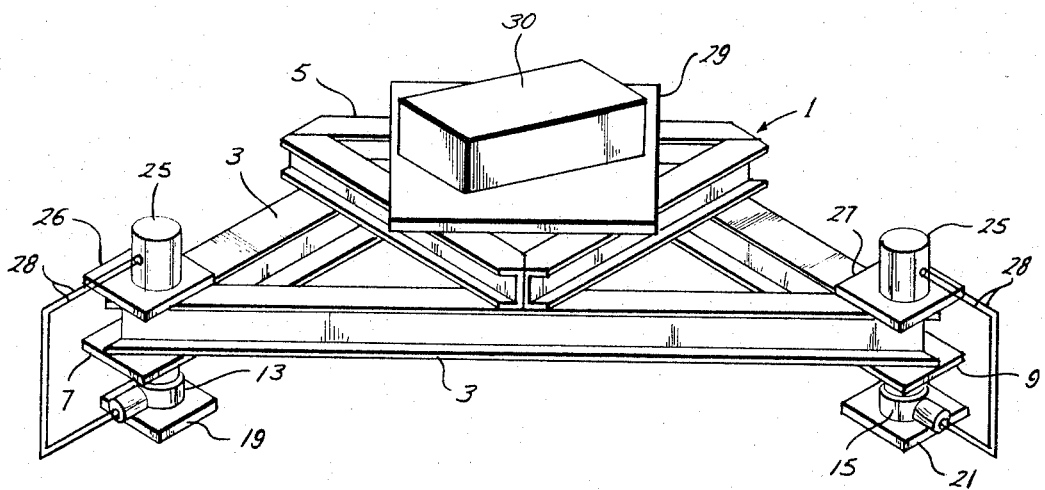
FIG. 1 shows an isometric illustration of an exemplary support table having micromotion jacks thereunder.

The exemplary support table 1 of FIG. 1 comprises two triangularly shaped members 3, 5, each constructed from three I-beams bolted to each other and with the smaller member 5 disposed in bisecting relationship with respect to the sides of the larger. The larger member 3 is supported on three mounting plates 7, 9, and 11. Micromotion jacks 13 and 15 are supported on each of two corners of the table. The third corner is supported by any appropriate means since level stabilization of the table requires only two jacks. Microjacks 13, 15 in turn are supported on heavy machined metal floor plates 19 and 21, which rest upon the floor of the building. One of the aforementioned Geotilt Recorders 25, or other low frequency disturbances measuring device, rests upon the corner plates 26, 27 on two of the corners of the larger triangle, as shown, and is electrically connected by wires 28 to each of the corresponding micromotion jacks thereunder. A precision instrument 30, or other load, rests upon mounting plate 29 disposed on the smaller triangle member 5. By receiving a signal from a Geotilt Recorder, its respective micromotion jack may individually, or in combination with another jack, level the mounting plate in the manner previously described. The micromotion jack, which is more clearly shown in FIG. 2, comprises a base plate 31 having tapped recesses in each of the four corners thereof. The recesses receive threaded legs 35, 37, and 39, the purpose of which are to provide a level base for the four corners of the jack. Main housing 33 is connected to the top surface of base 39 by cap screws 41, 43 (as best seen in FIG. 4). Main housing 33 has a horizontal hollow portion 44 disposed therein (see FIG. 3) which receives an internal thrust nut 46, which is in turn rotatably mounted in the side wall of the housing and has, protruding from the housing, an axle portion 51 connected to main drive gear 53. Main drive gear 53 in turn engages motor drive gear 55 of servomotor 57 mounted on a side of jack 58. The servomotor is in turn electrically connected to the aforementioned Geotilt Recorder, or other disturbance measuring device supported on the table.

Figure 3:
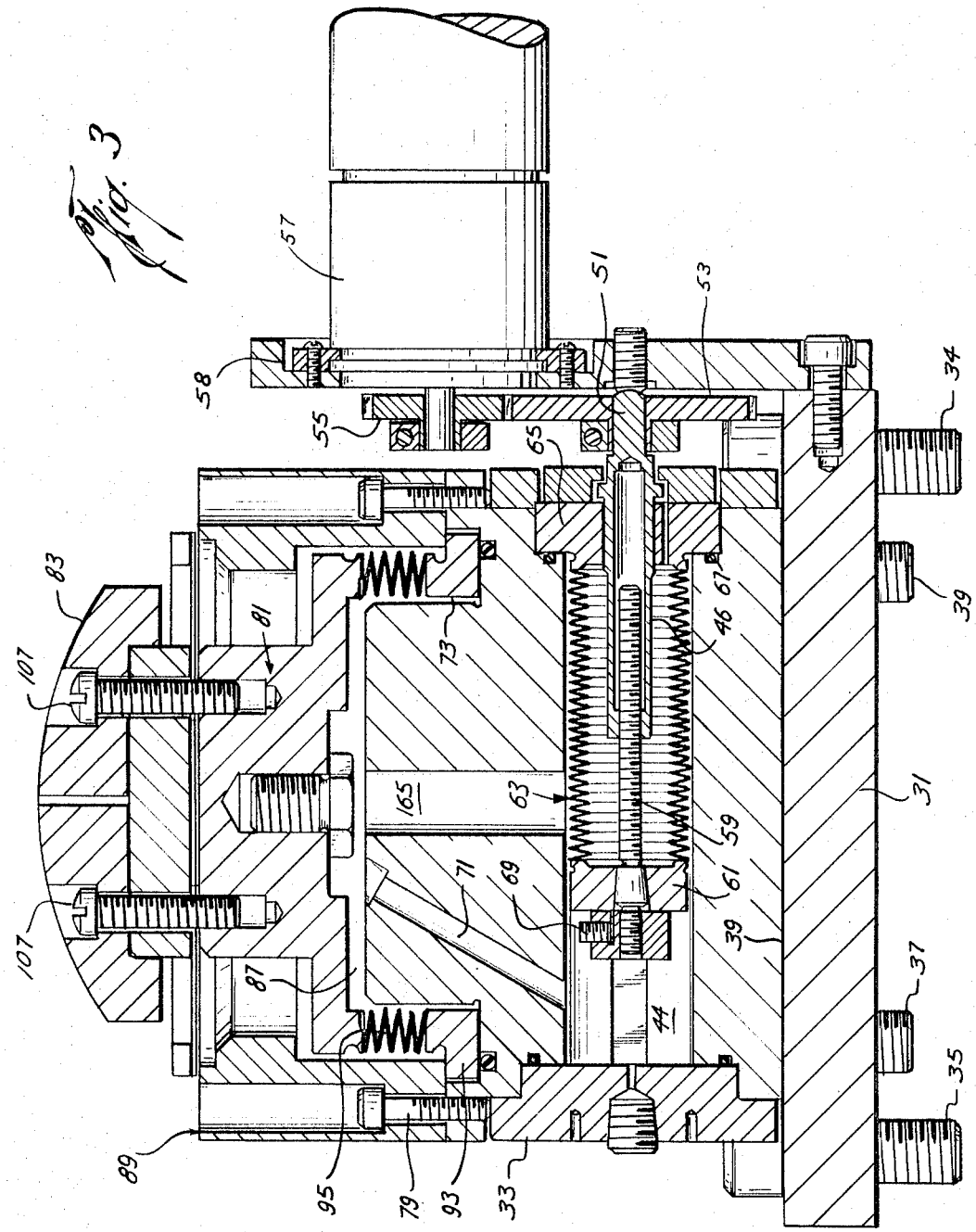
FIG. 3 is a vertical cross sectional view of the micromotion jack along the axis X—X of FIG. 2.

As best shown in FIG. 3, there is within thrust nut 46 a shaft or drive screw 59 having at the end thereof a vertically disposed primary bellows plate 61 which conforms to the cross sectional area of hollow portion 44. An expandable primary bellows-like assembly 63 is also disposed within the horizontal hollow portion 44, and is connected therein by means of recessed base member 65 which is set within a cutout portion of the housing adjacent the protruding portion of thrust nut 46. A conventional O-ring 67 is disposed in abutting relation with recessed base 65 of the primary bellows assembly 63, so as to preclude leakage of the hydraulic fluid at this point. The expandable body of primary bellows is integrally attached to base assembly 65 at one end, and at the other end to the vertically disposed primary bellows plate 61. Threaded shaft 59 which extends through the primary bellows plate may be anchored on the other side thereof by any appropriate means, for example, a set screw clamp 69 (as best shown in FIG. 3). Additionally there is provided (as shown in FIG. 4) a leaf spring 166 recessed in hollow 44, so as to prevent rotation of bellows plate 61 when thrust nut 46 is turned.

It is thus seen that upon reception of a signal from the servomotor, there is transmitted to drive gear 53 a rotating motion which, in turn, rotates thrust nut 46, causing drive screw 59 to travel away from recessed base 65 of the primary bellows assembly. This in turn decreases the volume of hydraulic hollow 44 and forces fluid up through passageway 71.

Figure 2:
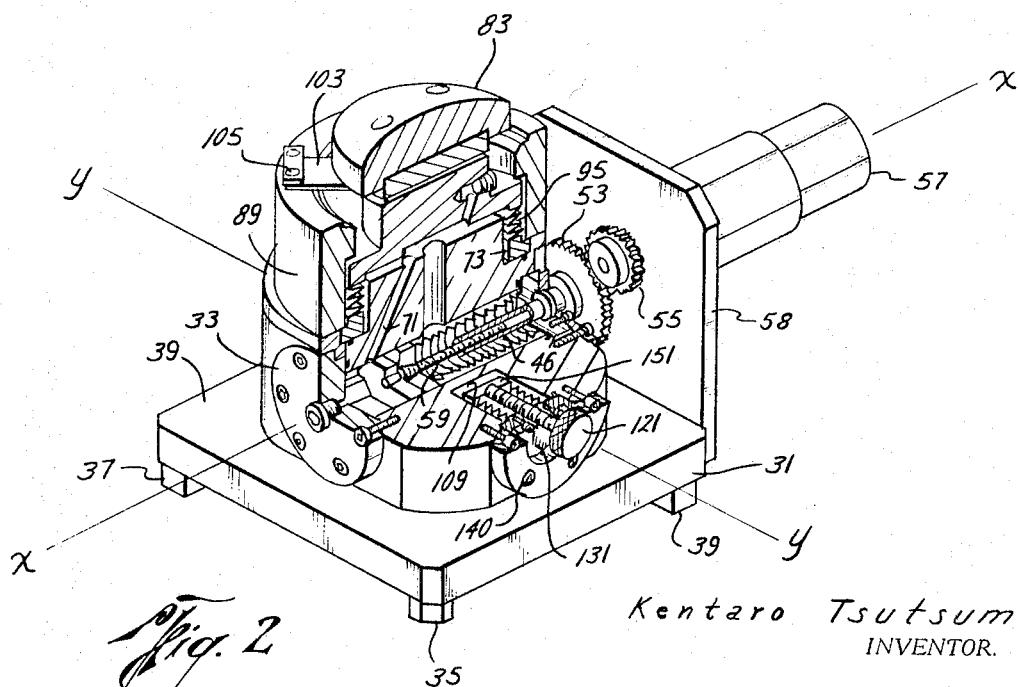
FIG. 2 is an isometric-partial cutaway view of the micromotion jack showing the internal mechanical arrangement thereof.

As shown in FIGS. 2 and 3, the angularly disposed fluid passageway 71 leads to the top portion of the main housing where an annularly disposed recess 73 extends therearound. Attached to the top of the main housing by recessed cap screws 79, is a top bellows assembly 81 which, in turn, has connected thereto the aforementioned spherical cap 83, the combination of which forms a cap assembly. The top bellows assembly, in conjunction with the main housing, forms a second hydraulic hollow (or reservoir) 87 which communicates with the first hydraulic hollow (or reservoir) 44 by means of the aforementioned passageway 71. Seated within annular recess 73 of the main housing, and anchored therein by a bellows retainer 89, is annular base 93 for the secondary bellows 95. The secondary bellows is connected to its aforementioned base at one end, and to top cap assembly 81 at the other end. Since there is a marginal radial clearance between the secondary bellows and the recess within which it sits, the secondary, and also the top bellows and cap would normally be subject to radially directed forces. To preclude this, however, there is provided four radial flexures 103 disposed at 90 degree intervals around the top of the top bellows assembly (see FIG. 2). These flexures are connected to top bellows assembly 81 at one end, and to bellows retainer 89 at their other end, by any appropriate means, such as screws 105. As previously mentioned, the support cap 83, which has a curved surface so as to transmit to the table a minimal of horizontal forces, is attached to the top bellows assembly 81 to thereby form a unitary expandable assembly. The cap is attached to the bellows assembly by recessed machine head screws 107.

In FIG. 4 and also FIG. 2 there is shown a pair of oppositely disposed, horizontally oriented hollow portions 109, 111, which receive identical manually adjustable bellows assemblies 113, 115, which are used to cause relatively large movements of cap 83 in order to attain a calibrating or a starting position for it. The adjusting means each comprise a trim screw 121 which is disposed in horizontal aperture 125 in the centers of bellows base plate 131. Bellows base plate 131 protrudes from a recessed portion in the main housing, and is fixed in abutting position to retainer member 135 having a series of apertures therein which receive anchoring cap screws 140 that extend into the plate. The plate and retainer are fixed to the housing by flange member 143.

As previously explained with respect to FIG. 3, there is provided a conventional seal 147 at the side of bellows base 131 closest to the hydraulic fluid. Bellows 115, as with each of the preceding two bellows, is connected at one end to its base portion, and at the other end to bellows plate 151, the cross section of which conforms to the cross sectional area of the hollow. The fluid in said hollow communicates with fluid body 44 by means of conduits 153, 155 (as shown in FIG. 4). In addition to passageway 71, fluid body 44 communicates with main fluid body 87 by means of vertical hole 165. The purpose of the vertical hole is to prevent the formation of any entrained air pockets in the hydraulic system when the unit is initially filled with fluid. Thus by manual rotation of trim screw 121 the height of spherical cap 83 may be varied due to the pressure transmitted by the hydraulic fluid via conduits 153, 155, and 71, and vertical hole 165.

With respect to the automatic drive portion of the jack, it is seen that movement of drive gear 53 rotates thrust nut 46, resulting in movement of bellows plate 61, as previously explained. Because of the comparative cross section area of the primary bellows and the secondary bellows, rotation of thrust nut 46 through and angle of .1 degree results in an upward motion of the secondary bellows of approximately .4 micro inch. Due to the use of the bellows structure throughout the micro drive device, substantially all sources of friction otherwise present in hydraulic jacks are eliminated. Therefore, adjustments with a high degree of precision are made possible.

It is to be recognized that the accuracy of the present micromotion jack is governed not by limitations of the structure of the jack itself, but more so by accurate control of the servomotor. Therefore, if angular position of thrust nut 46 were controlled to within $\frac{1}{10}$ of a degree, the motion of the spherical cap can be controlled to the order of .4 micro inch or better. However, normal operational movement of the thrust nut through a 1 degree arc will result in a controlled motion of the cap over a distance of 3.6 micro inches.

While the micromotion jack and drive mechanism have been disclosed only in a single embodiment, it should be understood that various modifications and adaptations thereof may be made within the spirit of the invention, as set forth in the claim which follows.

Therefore, what is claimed as new and desired to be secured by Letters Patent is:

A motor driven hydraulic mechanism for effecting movement of a load in response to an electrical signal comprising:

(A) a drive section including a hydraulic chamber having first and second end walls, a hydraulic fluid in said chamber for transmitting energy from the motor to the load;
   a flexible bellows means disposed within the hydraulic fluid and having a first end wall thereof affixed to said first end wall of said hydraulic chamber;
   said flexible bellows means having a thrust nut extending therethrough and through each said first end walls and into operative relationship with the motor;
   a drive screw axially aligned and threaded partially into said thrust nut, the end of said drive screw protruding from said thrust nut fixedly secured within a second end wall of said flexible bellows means so that rotation of said thrust nut by the motor causes movement of said second end wall along the thrust nut axis thereby varying the fluid volume in said lower housing chamber;

(B) a power transmitter section having disposed therein a pressure responsive assembly comprising:
   a movable support cap for contacting the load and a flexible bellows assembly, said cap being affixed to said bellows assembly, and
   a hydraulic conduit having one end communicating with said hydraulic chamber and the other end communicating with the interior of said flexible bellows assembly in said power transmitter section so that movement of said thrust nut causes correlative movement of said load contacting support cap.

References Cited by the Examiner
UNITED STATES PATENTS

| | | | |
|---|---|---|---|
| 2,093,604 | 9/1937 | Gallasch | 60—54.5 X |
| 2,240,287 | 4/1941 | Croll | 60—54.5 |
| 2,380,575 | 7/1945 | Brown | 60—54.5 |
| 2,800,055 | 7/1957 | May | 60—54.5 X |
| 3,071,930 | 1/1963 | Moulin | 60—54.5 |

References Cited by the Applicant
UNITED STATES PATENTS

| | | |
|---|---|---|
| 2,065,096 | 12/1936 | Robinson. |
| 2,362,135 | 11/1944 | James. |
| 2,372,610 | 3/1945 | Spase. |
| 2,672,313 | 3/1954 | Poole. |
| 2,717,138 | 9/1955 | Sheehan. |
| 2,879,928 | 3/1959 | Lavoie et al. |
| 2,964,015 | 12/1960 | Garey. |

MARTIN P. SCHWADRON, *Primary Examiner.*

ROBERT E. BUNEVICH, *Examiner.*